March 3, 1959  C. K. GRAVLEY  2,875,501
FORMING ELECTROMECHANICALLY SENSITIVE CERAMIC BODIES
Filed March 18, 1953  3 Sheets—Sheet 1

INVENTOR.
CHARLES K. GRAVLEY
BY
*Harries A. Mumma*
ATTORNEY

March 3, 1959 C. K. GRAVLEY 2,875,501
FORMING ELECTROMECHANICALLY SENSITIVE CERAMIC BODIES
Filed March 18, 1953 3 Sheets-Sheet 2

INVENTOR.
CHARLES K. GRAVLEY
BY
Harries A. Mummah
ATTORNEY

March 3, 1959  C. K. GRAVLEY  2,875,501
FORMING ELECTROMECHANICALLY SENSITIVE CERAMIC BODIES
Filed March 18, 1953  3 Sheets-Sheet 3

*INVENTOR.*
CHARLES K. GRAVLEY
BY
*Harries A. Mumma Jr.*
ATTORNEY

United States Patent Office 2,875,501
Patented Mar. 3, 1959

2,875,501
FORMING ELECTROMECHANICALLY SENSITIVE CERAMIC BODIES

Charles K. Gravley, Lakewood, Ohio, assignor, by mesne assignments, to Clevite Corporation, Cleveland, Ohio, a corporation of Ohio Application March 18, 1953, Serial No. 343,055

4 Claims. (Cl. 25—156)

This invention relates to methods of forming a dielectric ceramic body, and more particularly to a method of forming a ceramic body of electromechanically sensitive material having a shape characterized by openings or holes within the body.

Electromechanically sensitive ceramic materials, notably the titanate-type materials exemplified by barium titanate, offer several outstanding advantages for use in electromechanical transducing devices. These ceramic materials may take the form of simple plate-like bodies, in which case the bodies may be prepared for ceramic-firing by any of the well known methods of forming green ceramic bodies. A particularly advantageous method for forming such ceramic bodies is disclosed and claimed in my Patent No. 2,554,327, assigned to the same assignee as the present invention; in accordance with this method a layer of ceramic raw material is coagulated on an unrefractory form from a dispersion of the material in finely comminuted state after first applying a coagulating agent to the form. The form is eliminated during firing. Since it frequently is convenient to make the desired shapes by dipping the form in the coagulant solution and then in the liquid ceramic dispersion, this method may be called a dip-forming method. If the form has extensive flat surfaces, flat sheets may be prepared from the layer coagulated on each such surface. If the form has the shape of one or more elongated strips all sides of which are dipped, elimination of each strip during the firing leaves a hollow tubular ceramic body. Electromechanical transducers comprising such tubular bodies and having particularly advantageous transducing characteristics are described and claimed in Patent No. 2,614,143 to A. L. W. Williams, assigned to the same assignee as the present invention.

While the dip-forming method of my Patent No. 2,554,327 may be used in the production of hollow or tubular ceramic shapes which are difficult to produce by previously known methods and which are useful in the tubular transducers of the aforementioned Williams patent, other and even more complex shapes of electromechanically sensitive ceramic materials now have been found to have particular advantages, such as high electromechanical coupling, ease of handling by proper methods, and adaptability to the requirements of certain electromechanical applications such as microphone and phonograph pickup elements. Some of these shapes are described and claimed in my concurrently filed application Ser. No. 343,054, assigned to the same assignee as the present invention. Many of these shapes may be produced by methods already known to the art but with varying degrees of difficulty, which in many cases may result in very high costs and in some cases in practically insurmountable difficulties. This is particularly true of certain shapes having quite small openings or holes within the ceramic body.

Consequently it is an object of the present invention to provide a new and improved method of forming a ceramic body of electromechanically sensitive material which substantially avoids one or more of the limitations or disadvantages of the previously known methods.

It is another object of the invention to provide a new and improved method of forming a ceramic body of electromechanically sensitive material having openings or holes of a size and configuration such as practically to preclude fabrication of such bodies by known techniques.

It is a further object of the invention to provide a new and improved method of forming a ceramic body in which electromechanically sensitive ceramic raw materials are formed into ceramic shapes of particular utility in electromechanical transducers.

It is yet another object of the invention to provide a new and improved method of forming a ceramic body of electromechanically sensitive material by means of which noncomposite bodies of complex cross-sectional shape may be formed quickly, inexpensively, and without the necessity of great care to prevent breakage or undesirable deformations of the shape of the body.

The present invention contemplates a method of forming a dielectric ceramic element of generally quadrangular cross-section having a pair of substantially parallel major planar surfaces and a plurality of parallel longitudinally-extensive apertures extending through the element between and parallel to said surfaces. The method comprises pulling through a liquid coagulating agent longitudinally extensive heat-destructible core means of a configuration conforming to and adapted to form the apertures and subsequently pulling the core means, with the coagulating agent thereon, through a dispersion of the ceramic precursors of a dielectric ceramic material while maintaining the core means disposed in parallel relation spaced from each other by a constant distance. The method further comprises adjusting the rate of travel of the core means through the dispersion so as to enable the coagulating agent to accrete and gell on the core means a coherent mass of green ceramic of generally quadrangular cross-section having a major planar surface on each side of and parallel to the core means. The method also comprises maintaining the constant distance, while the core means is passing through the dispersion, at a value not exceeding the sum of (1) the dimension of the core means perpendicular to the planar surfaces and (2) twice the thickness of the accretion of the dispersion on the core means; and subjecting the green ceramic mass to a ceramic firing operation to mature the ceramic and destroy the core means.

Certain terms, as used in this specification and in the appended claims, may be characterized as follows. An electromechanically sensitive material of polycrystalline or ceramic nature is a material which, in the form of a compact mass or body, responds to the application of electric potentials thereacross, or to the corresponding electrostatic fields therein, by developing a substantial mechanical deformation. To enable such a body to develop electric fields upon the application of mechanical forces thereto it is necessary to condition the material, which usually is accomplished by applying a unidirectional polarizing voltage thereto. When so conditioned or polarized, the mechanical response of the material to electric fields, as well as its electrical response to mechanical forces, becomes linear. The titanate-type dielectric materials mentioned hereinabove are particularly useful in carrying out the method of the present invention; these ceramic materials, when polarized, exhibit in general linear electromechanical responses of high magnitudes. A dispersion of ceramic precursors or raw materials of an electromechanically sensitive ceramic of this type is a dispersion or suspension of small solid particles of such material which, upon coagulation into a dense structure, may be treated by ceramic techniques to form a coherent fired body of the electromechanically sensitive material; the fluid medium in which the raw ceramic particles are dispersed may contain additional dissolved or dispersed materials for the purpose of preventing settling of the dispersed particles prior to use, or for incorporation along with the electromechanically sensitive material in the coagulated body to improve its cohesion and green strength. A coagulating agent is any material which has the power of breaking down the dispersion locally to permit the deposition of a uniformly thick layer of the dispersed particles from the dispersion. It is possible to obtain a thin deposited layer by dipping almost any solid form in such a dispersion, but the thickness of a layer deposited without the aid of a coagulant tends to vary and to be particularly thin and unreliable over surfaces of the form which have high curvature; to obtain a satisfactorily uniform layer of controllable thickness a coagulating agent has been found to be indispensable. The term unrefractory material is intended to mean a material which cannot resist ceramic-firing temperatures and which burns, melts, vaporizes, or otherwise disintegrates at such temperatures. In referring to the supporting means made of such an unrefractory material or to the polycrystalline mass formed thereon the thickness dimension thereof is mentioned, since it is a purpose of the method of the present invention to produce ceramic bodies one dimension of which not only is small relative to another dimension of the body but also seldom exceeds a value of a sixteenth of an inch, although greater thicknesses are possible, and may have a value of less than a sixty-fourth of an inch. When a lateral dimension or lateral direction also is referred to, it will be understood that any direction in a plane perpendicular to the direction of the thickness dimension may be called a lateral direction, including the longitudinal or length direction of an elongated form or body.

For a better understanding of the present invention, together with other and further objects thereof, reference is had to the following description taken in connection with the accompanying drawings, and its scope will be pointed out in the appended claims.

Figure 1:
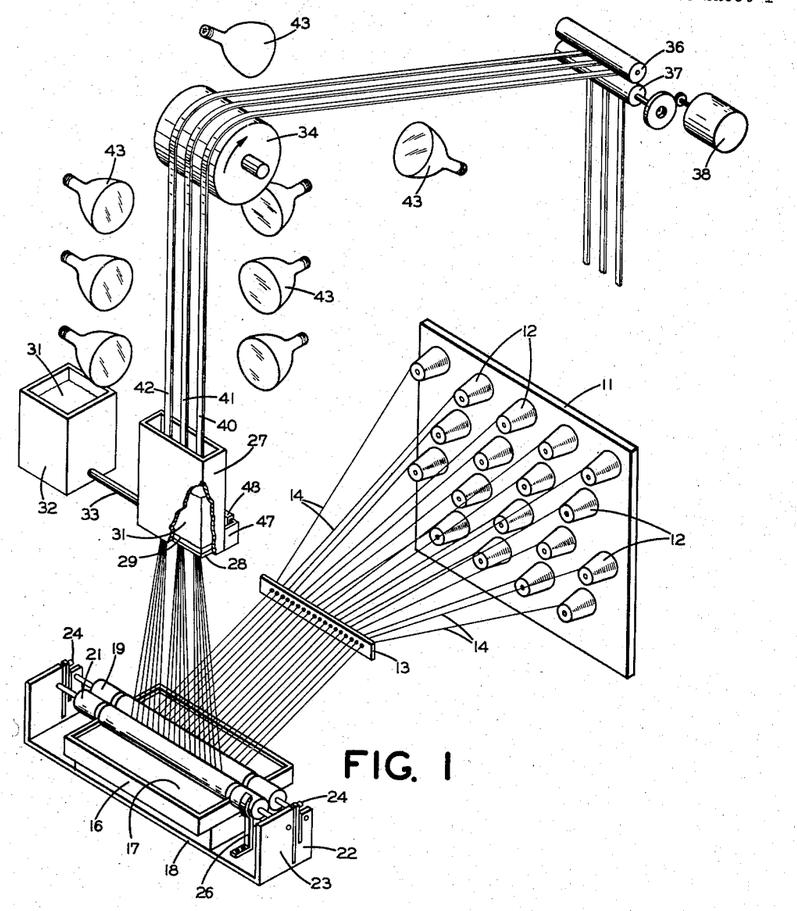
Fig. 1 is a perspective view of one form of apparatus useful in carrying out a method in accordance with the invention.

Referring now to Fig. 1, there is shown is perspective view apparatus useful in forming green ceramic bodies which, after ceramic-firing, provide ceramic shapes of particular utility for certain types of electromechanical transducers. The apparatus of Fig. 1 may be used in conjunction with conventional firing equipment in carrying out a complete method, embodying the present invention, of forming a fired ceramic body of electromechanically sensitive material.

The apparatus illustrated in Fig. 1 includes a mounting board 11 on which may be mounted a large number of spools 12, 12. The spools 12 are wound with a filamentary or fibrous material such as nylon thread. A guide 13, having numerous guide slots or holes disposed in a horizontal row, is affixed in front of the mounting board 11. As illustrated in Fig. 1, 18 spools are provided, and the threads 14, 14 are led from the spools through the individual holes in the guides 13, which is illustrated as having 18 guiding holes.

The threads 14 then pass over an edge of a shallow container 16 which holds a quantity of a liquid coagulating agent 17. The container 16 is mounted on a frame 18 having vertical members spaced from each end of the container, and these vertical members provide bearings for each end of a pair of rolls 19 and 21. The axes of these rolls are horizontal and parallel with the surfaces of the rolls adjacent to each other at points between their axes. These rolls are notched peripherally where they pass the two end walls of the container 16, so that the surfaces of the rolls can extend below the level of the liquid 17 within the container. The vertical members of the frame 18 are arranged to provide relative motion of the bearings for the rolls 19 and 21 to adjust the lateral separation between the rolls. Thus, considering the right hand vertical member of the frame 18 as viewed in Fig. 1, this member is divided vertically into two brackets 22 and 23 which carry bearings for the ends of the two rolls 19 and 21 respectively. A portion of the bracket 22 adjacent to the bracket 23 also is slit vertically, and an adjustment screw 24 passes through a clearance hole in this portion, past the slit, and into a tapped hole in the bracket 23. As the screw 24 is tightened to pull its head toward the bracket 23, a considerable tension develops in the bracket 22, and a part of this tension is transmitted through the lower part of the bracket 22 so as to urge the roll 19 toward the roll 21. It will be appreciated that this arrangement of the brackets and bearings permits a fine adjustment of the pressure between the rolls. To maintain parallelism between the rolls an identical arrangement of brackets and adjustment screws is provided for the bearings at the other end of the rolls. The threads 14 pass under the roll 19 into the liquid 17 and then upwardly between the two rolls. A spring member 26 is mounted on the frame 18 and bears against the surface of the roll 21; adjustment of the mounting position of the spring member on the frame affords an adjustable braking pressure against the roll 21. Since the threads 14 can be squeezed with moderate pressure between the two rolls, as determined by the setting of the screws 24, and thus minimize slipping of the threads over the rolls, the brake 26 permits maintenance of an adjustable tension in the threads 14 when they are pulled through the rolls.

There also is provided in the Fig. 1 apparatus, positioned above the container 16, another, rather deep container 27, a lower corner of which is cut away in the view of Fig. 1 to expose the contents thereof. The bottom wall 28 of the container thus may be seen, and the container holds in its bottom portions a quantity of liquid mercury 29 forming a shallow pool over the bottom 28. The container 27 also holds, floating on the mercury 29, a quantity of a dispersion of electromechanically sensitive ceramic raw material in an aqueous liquid dispersing medium, this liquid dispersion being designated by the reference numeral 31. A reservoir of the liquid dispersion is maintained in an auxiliary tank 32 disposed to one side of the container 27, the liquid levels in the container 27 and the tank 32 being maintained the same by providing a connecting pipe 33 therebetween. By this means the volume of the aqueous dispersion in the container 27 may be kept quite small, so that it is being replenished continually from the tank 32. If the dispersion in the tank 32 is required to stand for long periods of time before transfer to the tank 27 through the pipe 33, it may be desirable to provide stirring or agitating means, not shown, to furnish a mild stirring action within the tank 32. Structural features in the lower part of the container 27 will be discussed hereinbelow with reference to the detailed view of Fig. 2.

Above the tank 27 is located a free-running guide roller 34 with its axis horizontal and parallel to the axes of the rolls 19 and 21. The roller 34 is disposed so that a vertical plane, constructed tangent to its surface on one side of its axis, would pass centrally through the container 27. An additional pair of rolls 36 and 37 is disposed at about the same vertical level as the guide roller 34 but separated a convenient distance therefrom. These two rolls also have axes parallel to the axes of the rolls 19 and 21. The upper roll 36 may be provided with hinged bearings, not shown, permitting vertical motion of its axis toward or away from the axis of the roll 37, so that the roll 36 may be weighted to adjust the pressure between the rolls 36 and 37. The lower roll 37 is driven through suitable gearing by a motor 38.

As seen in Fig. 1, the threads 14, emerging from between the rolls 19 and 21, are gathered laterally into three adjacent groups of six threads each as they pass upwardly to the bottom of the container. These three groups pass through the container 27 and emerge from the open top thereof as three respective individual elongated structures 40, 41, and 42, formed in a manner discussed hereinbelow. These structures pass over the guide roller 34 and between the rolls 36 and 37, from which they emerge to hang vertically below the roll 37. A number of heat lamps 43, 43 are disposed so as to be directed at the elongated structures 40-42 as they pass from the container 27 over the guide roller 34 and also as they pass from that roller to the rolls 36 and 37.

Figure 2:
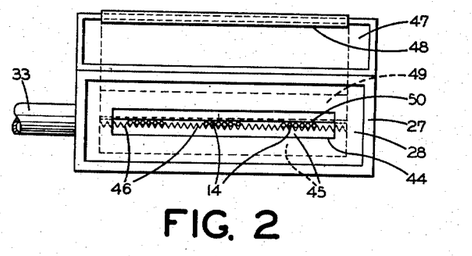
Fig. 2 is a more detailed plan view of a portion of the apparatus of Fig. 1.

Fig. 2 is a detailed and enlarged plan view of the container 27, viewed looking downwardly at the open top of the container. The liquids 29 and 31 are not shown, and the threads 14 are shown as if unaffected by the action of the liquid dispersion 31. The bottom 28 of the container 27 is seen to have a rectangular opening 44. Affixed directly beneath the bottom 28 is a plate 45, one long edge 46 of which extends into the space uncovered by the opening 43. The edge 46 is serrated to provide a succession of triangular indentations into that edge along the length direction of the opening 44. Each group of six threads 14 is held within a corresponding group of six adjacent ones of these indentations with several unoccupied indentations between the central group of six threads and each of the outer two groups. In this way the pitch and depth of each indentation in the serrated edge 46 determines the lateral separation of the individual threads in each group of six threads.

The assembly shown in Fig. 2 also includes an arrangement having the dual purpose of maintaining the threads 14 pressed into the respective serrations in the edge 46 and of applying moisture to the threads as they pass these serrations. This arrangement includes a relatively shallow trough 47 affixed along one side of the container 27 at the bottom thereof. One end 48 of a felt strip dips into the rear of the trough 47. The strip passes down the back of the trough 47 and thence forward beneath the trough. As the strip continues forward beneath the container 27 it passes under a plate 49 and is doubled up and back between the plate 49 and the bottom 28 of the container, the plate 49 being affixed under the bottom 28 so as to anchor the felt strip. In this way the far end 50 of the felt strip, where it is doubled up around the edge of the plate 49, presses against the serrated edge 46 of the plate 45 and against any threads passing through the serrations. When the trough 47 contains water in contact with the end 48 of the felt strip, this water passes slowly by capillary absorption along the strip over the back of the trough 47 and under the trough and container 27 to the end portion 50 which is in contact with the threads 14.

The apparatus of Figs. 1 and 2 may be used in forming a ceramic body of electromechanically sensitive material having a predetermined over-all thickness dimension prior to ceramic-firing thereof. This apparatus as illustrated provides a practically continuous length of such a ceramic structure in the green or unfired state. The apparatus is set up for forming the ceramic body by inserting the individual threads 14 in the corresponding slots or holes in the guide 13, loosening the set screws 24 and inserting the threads upwardly between the rolls 19 and 21, passing the threads within the proper serrations in the edge 46, tightening the plates 45 and 49 beneath the container 27 to maintain the end 50 of the felt strip pressed against the serrations, and passing the three groups of threads over the guide roller 34 and the driven roll 37. The motor 38 then is actuated to turn the roll 37 so as to rotate the guide roller 34 in the sense indicated by the arrow and pull the threads 14 upwardly from the container 16 and through the container 27. The set screws 24 then are tightened to obtain a moderate tension in the threads. As the threads are unwound from the spools 12 and drawn through the apparatus, they tend to converge gradually into the three groups, each of six threads, as they pass from the guide 13 to the serrated edge 46 beneath the container 27, but after passing the serrated edge 46 they tend to remain parallel and so retain the spacing established by the serrations. The mercury pool 29 now is established in the bottom portions of the container 27, and the dispersion 31 is supplied from the tank 27 through the pipe 33 to the portions of the container above the mercury.

Broadly expressed, the formation of the elongated green ceramic body in accordance with the invention is carried out by applying the liquid coagulating agent 17 in the container 16 to an unrefractory supporting means which is thin compared with the predetermined thickness dimension of the green ceramic shape being formed, and which has at least one aperture between the lateral marginal edges of the supporting means. As shown in Fig. 1 this supporting means is made up of a plurality of longitudinally extensive forms, that is, the individual threads 14. These forms are aligned in parallel, laterally separated relationship as they pass through the container 27, leaving an aperture between each adjacent pair of the forms or threads. Accordingly each group of six threads constitutes one such unrefractory supporting means, and the thickness of this means is the thickness or diameter of each thread as measured in the direction normal to the plane containing the axes of the threads, this being a vertical plane within the container 27 as viewed in Fig. 1. Hence the supporting means has five apertures when six threads are used in each group, and the surfaces of the first and sixth threads in each group which are farthest removed from the other threads in the group constitute the lateral marginal edges of the group considered collectively as a single supporting means. When the threads 14 are used in groups to make up the thin supporting means, the individual threads or supporting forms are each generally circular in cross-section. As illustrated, the threads are aligned in generally coplanar relationship, since their axes lie in the same plane as they pass through the container 27.

After the coagulating agent 17 is applied to the threads 14 as they pass under the roll 19, contact is caused between each supporting means made up of a group of six threads 14 and a quantity of the dispersion 31 of electromechanically sensitive raw material in the container 27 for a sufficient length of time to coagualate a coating of the ceramic raw material which covers the surfaces of the supporting means to the aforementioned predetermined over-all thickness and which fills each aperture in the supporting means, the apertures being, of course, the spaces between the forms or threads 14. The resulting coated supporting means is, of course, the structure 40, or one of the similar structures 41 or 42, which appears above the container 27 in the view of Fig. 1.

The method steps described hereinabove comprise applying the coagulating agent to the supporting means and causing contact between this means and the liquid dispersion. The steps are carried out in the apparatus of Fig. 1 by passing the longitudinally extensive supporting means through a quantity of the liquid coagulating agent 17 in the container 16, and subsequently passing the supporting means, carrying portions of the coagulating agent, through an opening in the container 27 providing a free-running fit for the supporting means. Considering each group of six threads 14, this opening is provided between the serrations of the edge 46 of the plate 45 and the end 50 of the felt strip. The felt strip presses against the threads within the serrations and also against the adjacent serrations on each side of the group of threads. However, small unfilled spaces inevitably remain between each thread and the bottoms of its serration, between the individual threads where the felt strip does not conform to the spaces between the threads, and between the felt strip and the serrations on each side of the group of threads. An attempt to close all such spaces by applying great pressure through the felt strip probably would fail to accomplish its purpose and in any case would impair the free-running nature of the fit between the individual threads of the supporting means and the plates 45 and 49, which, along with the felt strip, form the opening in the bottom of the container 27.

Having passed through this opening, the threads making up the supporting means pass into the bottom portions of the container 27, past the mercury 29 which effectively seals that opening, and through the liquid dispersion 31 floating on the mercury. The irregular, perforate, or multiple shape of the supporting means accentuates the problem of effecting a suitable liquid seal at the opening in the bottom of the container 27. The mercury in the pool 29 does not wet either the opening formed by the plates 45 and 49 and the felt strip or the threads 14 making up the supporting means. Therefore, a very large hydrostatic head of liquid above the opening would be necessary to force the liquid mercury through any unfilled spaces in the opening which are not rather extensive in two dimensions. The aqueous dispersing medium not only has a lower specific gravity than that of the mercury, so that it floats on the pool of mercury, but also is mutually immiscible with the mercury, so that there is no migration of either liquid into the other. Accordingly the aqueous medium remains separated from the opening in the bottom of the container by the intervening pool of mercury. This closure, utilizing an immiscible liquid which does not wet the materials in and around the opening, provides a particularly useful method of passing an elongated structure, such as the supporting means, in contact with a body of liquid, such as the dispersion 31.

As the supporting means or group of threads 14 passes through the liquid dispersion 31 in the tank 27, the speed of the motor 38 is controlled or adjusted so that the supporting means passes through the dispersion at a rate sufficiently slow to effect coagulation therefrom of a coating of the ceramic raw material which covers the surfaces of the supporting means to the desired depth, as will be discussed in more detail hereinbelow.

It will be noted that the Fig. 1 apparatus causes passage of the longitudinally extensive supporting means through the liquid coagulating agent 17 and through the dispersion 31 by pulling the threads through the coagulating agent, and by subsequently pulling the threads through the dispersion while they carry portions of the coagulating agent. The pulling tension exerted by the driving roll 37 against the threads, upon suitable adjustment of the brake 26 on the roll 21, maintains the threads in a taut condition between these rolls and thus maintains the desired relative spacing of the individual threads in each group. This relative spacing becomes constant after the threads pass through the serrations in the edge 46, and the spacing is stabilized completely as the ceramic raw material deposits or coagulates on and between the threads within the container 27.

A dispersion of an electromechanically sensitive titanate-type ceramic raw material is preferred for use in the method of the invention, and a ceramic raw material consisting primarily of barium titanate provides, after ceramic-firing, electromechanically sensitive ceramic bodies having very desirable properties for electromechanical transducer use. A dispersing agent, present in the dispersion 31 in small proportions, prevents premature settling or deposition of the ceramic raw material. As an example of a suitable dispersion of ceramic raw material, a slurry or slip formulation may be used containing 1000 grams of a comminuted, commercially available electrical grade barium titanate material, including up to several percent by weight of other oxidic materials some of which act as fluxes during the subsequent ceramic-firing, dispersed in about 210 grams of water. A dispersing agent, in this example about 10 grams of a sodium ligno-sulfonate, is dissolved in the slip, to which also are added 75 cubic centimeters of a 20% aqueous solution of polyvinyl alcohol, which is coagulated or gelled from the solution along with the dispersed material as a binder to add green strength to the coagulated body. A preferred coagulating agent for use in the container 16 is an aqueous solution of ammonium pentaborate, $NH_4B_5O_8$; a suitably strong solution is obtained by using 10% to 15% of the pentaborate by weight. This solution advantageously also contains about 0.1% by weight of a non-ionic wetting agent such as ether sulfonate. The use of such dispersing agents and coagulating agents is discussed in my aforementioned Patent No. 2,554,327. When the Fig. 1 apparatus is used, there is a tendency of the water and other liquid components of the aqueous coagulating agent to evaporate during the passage of the threads from the container 16 to the container 27. This tendency has been found to affect the coagulation adversely. A function of the moist felt strip is to replace the liquid thus lost by evaporation.

The action of the coagulating agent is necessary to obtain a satisfactorily high rate of deposition of the ceramic raw material from the dispersion, to obtain sufficient thickness of deposition on the supporting means or forms, and to obtain a sufficiently uniform layer of deposited material. Experience indicates that the coagulant migrates through the initially deposited layers to effect accretion of additional layers of material, thus building up the desired thickness or depth of the coagulated material. This coagulating action takes place from the edges of each aperture in the supporting form progressively toward the middle of the aperture, so as to coagulate a mass of the raw material within each such aperture. Thereafter continuing the contact between the supporting means and the dispersion causes coagulation of a coating which covers additionally not only the major surfaces of the supporting means but also each such mass of material, coagulated within each of the apertures, to a depth resulting in an over-all thickness, measured through the apertures as well as through the supporting structure, everywhere approximately equal to the predetermined over-all thickness dimension of the green body.

In this way a coating of the ceramic raw material is accreted which fills each aperture in the supporting means that is, each space between the generally circular threads thereof, and which covers the surfaces thereof to build up a body with the predetermined over-all thickness dimension. The body thus is built up to attain the desired predetermined thickness as measured in a direction normal to the plane in which the generally coplanar threads 14 are aligned as shown in the Fig. 1 apparatus. This over-all thickness dimension preferably is between about two times and about four times the thickness dimension of the thin supporting means itself, the last-mentioned thickness dimension being equal to the diameter of the coplanar threads 14 shown in Fig. 1. When the coagulation is continued to obtain a relationship of supporting form thickness to over-all thickness within the approximate range just mentioned and the green body is fired, a cross-sectional configuration of the ceramic body is obtained which is advantageous for applications of the ceramic structure to certain electromechanical transducer devices, referred to hereinbelow. Such proportioning of the thickness dimensions also contributes to the ease of carrying out the coagulation operation to obtain uniformity of the dimensions of the body before and after ceramic firing.

It may be noted that reasonable care must be exercised when submitting the dispersion to the action of the coagulating agent carried on the supporting means. An example of the difficulties which may be encountered is afforded by the situation which tends to arise if the mercury seal at the bottom of the container 27 is omitted. In such a case minute quantities of the aqueous dispersion tend to run down the threads 14 through spaces between the threads and the opening in the bottom 28 of the container. As a result of premature coagulation small masses of coagulated material can gather around the opening and attach themselves from time to time upon the threads, causing lumps or other deformations in the green ceramic structure 40, 41, or 42. Even when no leakage occurs through the bottom of the container, such lumps or deformations tend to occur in the absence of the pool of mercury; this may be caused by transfer of some coagulant to the surfaces of the bottom wall 28 adjacent to the opening, after which coagulation takes place from any dispersion which can reach these surfaces until the coagulated mass grows into contact with one of the threads 14 and adheres to the thread. These difficulties are not encountered with the mercury seal. It will be evident to those skilled in the fabrication of green ceramic bodies that due care must be exercised in the design and operation of apparatus for carrying out the presently described method to avoid erratic operation. However, experience has shown that no unusual difficulties are experienced if reasonable care and conventional precautions are used in the preparation of the coagulating agent and the raw ceramic dispersion and in the design and operation of the apparatus used.

After the elongated surfaces of one of the unrefractory supporting means have been covered with the coating of the ceramic raw material to obtain a practically continuous structure, such as the structure 40 shown in Fig. 1, this structure is dried by the heat lamps 43 as it is drawn past the roller 34. As the coated elongated supporting means passes downwardly from the roll 37 it is cut into a plurality of predetermined lengths. Each such length may be represented by the body 51 as viewed in enlarged perspective in Fig. 3. These lengths are placed in a suitable furnace, reasonable care being taken to avoid deformation of the green ceramic body. To this end the lengths may be placed carefully on suitable non-reactive supports such as barium titanate tiles within the furnace.

Figure 3:
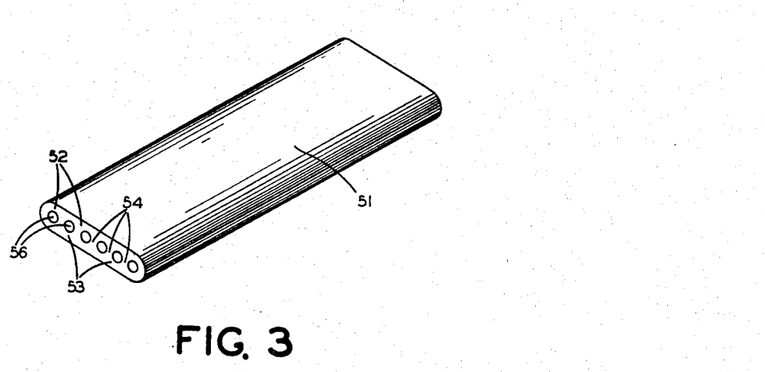
Fig. 3 is an enlarged perspective view of a ceramic body of electromechanically sensitive material formed by the method of the invention, the apparatus of Figs. 1 and 2 being used to produce the body in the green state.

These lengths of the coated supporting means then are heated in the furnace to ceramic-firing temperatures with firing of the coating of material, coated on the supporting means, and elimination of the unrefractory means itself to leave a unitary, noncomposite, coherent body of the electromechanically sensitive material as a result of the ceramic-firing of each of the green lengths. The fired body also may be represented by the body 51 shown in Fig. 3, it being understood that its dimensions and physical condition are modified by the firing, and that the threads within the green body disappear, usually leaving no appreciable residue or ash. Each of the plurality of fired bodies has surface portions, including upper surface portions 52 and lower surface portions 53 as shown in Fig. 3, composed of the material coagulated on the surfaces of the supporting means or group of threads 14. Each body 51 also has, between the surface portions 52 and 53, a connecting portion composed of the material coagulated in each of the apertures or spaces between the threads 14 in the supporting means. The body 51 has five such connecting portions, collectively designated by the reference numeral 54 in Fig. 3. The threads or forms 14, burned out during the firing, leave the body 51 with six generally circular holes 56 extending longitudinally through the body. The ceramic-firing procedure produces the well known ceramic structure in the body 51, characterized by the bonding of the numerous crystalline grains in the body to each other by vitreous or semi-vitreous material. When adequately performed on a raw material of a conventional formulation suitable for ceramic purposes, the firing produces ceramic bonds throughout the body which are strong and uniform, so that, at least as evidenced by the behavior of the body when subjected to mechanical stresses, no substantial interface exists between contiguous masses of the material in the body, which then behaves as a coherent unitary structure under all physical tests not producing strains beyond the ordinary elastic limits of the ceramic and which may be termed noncomposite.

In forming a ceramic barium titanate body, such as the noncomposite body 51 composed of the ceramic material 52 and 53 in its surface portions and the ceramic material 54 therebetween, a shrinkage is to be expected during firing to dimensions of the order of 80% of the dimensions of the green structure. The fired body 51 may be used with particular advantage in electromechanical transducer devices utilizing a bending mode of motion. For example, electrodes may be introduced within the holes 56, as by allowing a liquid suspension of finely divided conductive particles to be drawn into the holes by capillary action. A similar suspension of conductive particles may be painted on the upper surface and on the lower surface of the body 51. These electrode coatings are dried and baked to form upper and lower electrodes and also inner electrodes within the holes 56; the electrodes are not shown in the drawings. A unidirectional polarizing potential may be applied between the two outer electrodes connected in parallel and the inner electrodes. Thereafter, when one end of the body 51 is held rigidly and the free end is moved up and down, corresponding signal voltages appear across the two outer electrodes. Bender transducer devices of this and related types, including electrodes and mechanical arrangements for use as a transducer, are described and claimed in my aforementioned application for Letters Patent of the United States Serial No. 343,054. Particularly advantageous procedures for forming the electrodes and applying polarized potentials are described and claimed in my concurrently filed application for Letters Patent of the United States Serial No. 343,056. In one example of a fired transducer body made with the shape of the body 51, there were six generally circular holes 56 about 0.007 inch in diameter separated at their nearest edges by about 0.009 inch across each connecting portion 54. The outer thickness portions 52 and 53, including the two elongated edge portions around the outermost holes, were about 0.0105 inch in thickness, giving an over-all thickness dimension, after ceramic-firing, of about 0.028 inch and an over-all width dimension of about 7/64 inch. A convenient length of the body 51 for use in bender devices might be 3/4 inch.

Ceramic bodies having shapes quite different from that of the body 51 shown in Fig. 3 may be produced with the apparatus of Figs. 1 and 2. By providing 12 additional spools 12 to supply 12 additional threads 14 passing through 12 additional holes in the guide 13, the serrations in the edge 46 of the plate 45 lying between the three illustrated groups of 6 threads each can be filled. Then a single unrefractory form of 30 parallel, equally spaced threads passes through the containers 16 and 41 to produce a body which, after firing is again about 1/32 inch in thickness but is about 1/2 inch in the other lateral dimension, which may be called the width by analogy to the shape of the body 51. If lengths of this green structure are cut short enough to make the holes left by the threads, say, only 1/4 inch long after firing, the body becomes wider than it is long; more properly speaking, its length then is 1/2 inch measured across the holes and its width is 1/4 inch measured along the holes. In fact, there is no great difficulty in using 100 or more threads, so that square bodies over 1½ inches on a side, or bodies 1½ inches across the holes and only, say 3/16 inch along the holes, may be made while maintaining the same small over-all thickness dimension. The capillary holes in such bodies can be electroded by the method mentioned above.

Figure 4:
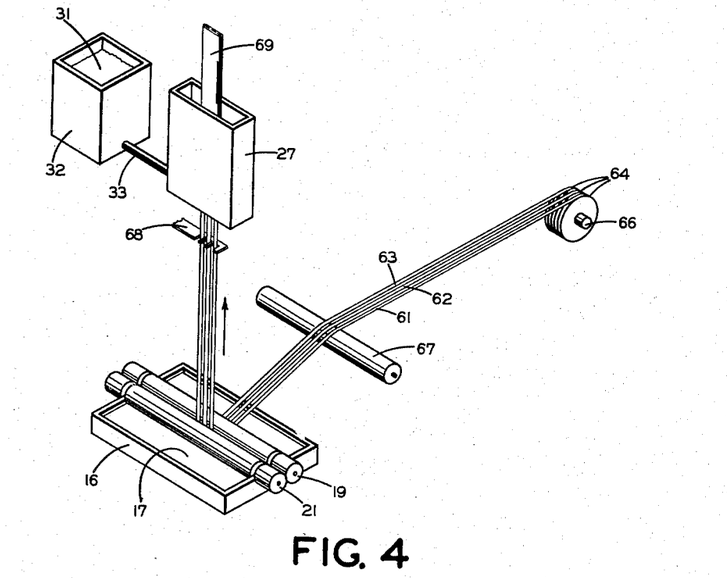
Fig. 4 is a perspective view of a modified apparatus of the type shown in Fig. 1 for carrying out a method in accordance with the invention.

Referring now to Fig. 4, there are illustrated in perspective view portions of a modified apparatus generally similar to the Fig. 1 apparatus. Thus the apparatus shown in Fig. 4 includes the shallow container 16 holding a coagulating liquid 17, into which extend the bottom surfaces of the pair of rolls 19 and 21. Also shown in Fig. 4 are the container 27 and the auxiliary tank 32, connected by the pipe 33, for the raw ceramic dispersion 31. Not shown in Fig. 4 are the guide roller 34 and the driven roll 37 for pulling the unrefractory supporting means through the apparatus and the heat lamps 43 for drying the material deposited on the supporting means. Instead of the threads which make up the supporting means illustrated in Fig. 1, the apparatus of Fig. 4 is arranged to utilize a supporting means made up of a plurality of longitudinally extensive flat strips, more specifically three such strips 61, 62, and 63. As the strips are pulled through the coating apparatus they are maintained aligned in coplanar, parallel, laterally separated relationship, mutually spaced so as to leave an aperture between adjacent edges of each adjacent pair 61, 62 and 62, 63 of the strips. The strips 61–63 are unwound from individual narrow spools 64. These spools are placed on a shaft 66, aligned parallel to the rolls 19 and 21, and the spools are spaced along the shaft 66 to maintain the approximate spacing desired between adjacent pairs of strips. Thus the three spaced strips, after passing over a guide 67, dip into the liquid coagulant 17 under the roll 19 and then pass upwardly between the rolls 19 and 21 through an opening in the bottom of the container 27. The arrangement in the bottom of the container 27 may be identical with that illustrated in Fig. 2, except that the serrations should be omitted in the edge 46 of the plate 45. To insure the desired spacing between the edges of the strips 61–63, a spacer 68 is disposed just below the container 27. This spacer has three slots through which the three strips 61–63 pass. Each of these slots has the same width as the strip passing through it, and the portions of the spacer between the slots have a width equal to the desired spacing between the strips.

Figure 5:
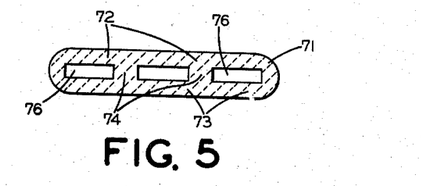
Fig. 5 is an enlarged cross-sectional view of the ceramic body produced with the use of the apparatus of Fig. 4.

The operation of the coating apparatus represented in Fig. 4 is quite similar to the operation of the Fig. 1 apparatus. The three strips 61–63 together make up a single, thin supporting means, but it will be understood that additional sets of strips could be run simultaneously through a similar apparatus if the sets are well spaced from each other. The supporting means, carrying portions of the coagulating agent 17 from the container 16, is exposed to the dispersion 31 in the container 27 to coagulate a coating which covers the flat surfaces of the strips to the predetermined over-all thickness, thus producing a coated structure 69. During the firing, after the coated structure 69 is cut into lengths, the unrefractory strips 61–63 of the supporting means burn out to leave a noncomposite, coherent, ceramic body having a cross-sectional configuration represented in the view of Fig. 5. Each length forms a ceramic body 71 having upper and lower surface portions 72 and 73 respectively and having between these surface portions two connecting portions 74 composed of the ceramic material coagulated in the two apertures between the two pairs of strips. In this case the three strips leave three holes 76 extending longitudinally through each length of the ceramic. The body 71 may have over-all dimensions approximately or exactly the same as the corresponding dimensions of the body 51 illustrated in Fig. 3. In any case, the body 71 may be electroded and mounted in a transducer device which functions in a manner quite analogous to the functioning of the device 51 when arranged for use in the bender transducer described hereinabove.

Figure 6:
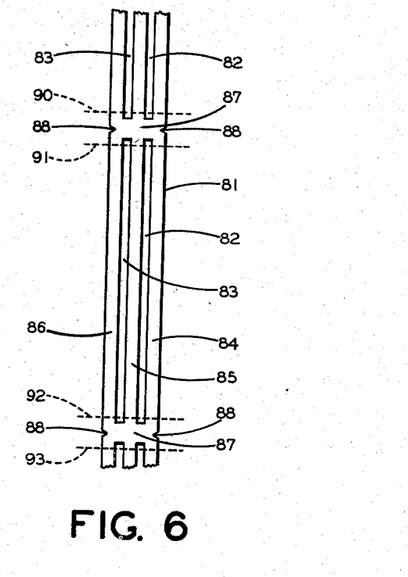
Figs. 6 and 7 are plan views of alternative types of unrefractory supporting forms suitable for carrying out the method in accordance with the present invention, using apparatus otherwise similar to that shown in Figs. 1 and 4.

Numerous and varied shapes of the unrefractory supporting means may be used in carrying out the method of the invention. One modification of the supporting means is the form 81 which is illustrated in Fig. 6. This form has a thin, elongated shape, and the view of Fig. 6 shows the major surfaces on one face of the form. Two rather narrow elongated holes or slots 82 and 83 are cut out of the form, leaving three parallel strip-like portions 84, 85, and 86, one between the slots 82 and 83 and the other two extending to the lateral edges of the form 81. At regular intervals along the length of the form bridging portions 87 interrupt the holes 82 and 83, and index marks 88 are notched into the edges of the form at these bridging portions. For convenience of discussion pairs of dashed reference lines 90, 91 and 92, 93 are shown in Fig. 6 just above and below each of the bridging portions 88 shown in the figure.

In carrying out the method of the invention only the portion of the form 81 between the reference lines 90 and 93, as shown in Fig. 6, need be used as the supporting means. This supporting means is placed in a quantity of the liquid coagulant and subsequently is placed in a quantity of the dispersion of raw ceramic material in a liquid dispersing medium. The form 81 carries portions of the coagulant with it into the dispersion to effect the desired coagulation. While this coagulation occurs, the form must be constrained to maintain a predetermined configuration. One method for effecting this constraint is to fasten a weight temporarily to one end of the form and to dip the form, held by its unweighted end, first into the coagulant and subsequently into the dispersion. This requires, of course, containers for the coagulant and for the dispersion sufficiently deep to receive the entire length of the form. Upon removal from the dispersion the coated form may be dried and the end section between the reference lines 90 and 91 and also the section between the reference lines 92 and 93 cut off. Ceramic-firing then produces a body which may be entirely undistinguishable from the body 71 shown in cross-section in Fig. 5, since the strip-like portions 84–86 function quite analogously to the strips 61–63 used in the Fig. 4 apparatus, while the elongated apertures 82 and 83 in the form 81 permit the formation of the two connecting portions 74, 74 of ceramic material between the strip-like portions 81–83 of the form 81 during the coating operation.

If the form 81 is of sufficiently stiff material, the coating operation may be carried out by dipping without weighting one end of the form. However, in a preferred embodiment of the process of the invention, the coagulant and the green ceramic particles are applied in a different manner, utilizing a continuous roll of the form 81 having numerous successive bridging portions 87 with a pair of parallel holes 82, 83 extending between each successive pair of these bridging portions. In that case the roll having the configuration of the form 81 may be used in place of the strips 61–63 in an apparatus otherwise exactly similar to the Fig. 4 apparatus, except that the bridging portions 88 maintain the required spacing between the strip-like portions 84–86 of the form, so that the spacer 68 may be dispensed with. Before firing, but after the form has been dried in passing the heat lamps 43 and the drive rolls, the coated form is cut laterally at approximately the locations of each of the reference lines 90, 91, 92, 93, etc. The index marks 88 leave notches in the material coated over the bridging portions 87 so that the proper location for the reference lines 90–93 may be determined after the form, including the holes 82 and 83, has been completely coated. Each of the lengths obtained by the cutting operation, such as the length between the reference lines 91 and 92, produces, when the coated form in that length is fired with elimination of the unrefractory material of the form, a ceramic body having approximately the over-all dimensions of the body 51 illustrated in Fig. 3 but having a cross-sectional configuration identical with that of the body 71 illustrated in Fig. 5. It will be understood that the tension maintained in the form 81 between the driving rolls and the rolls 19, 21 serves to constrain the form so as to maintain the predetermined configuration during the coating operation.

Figure 7:
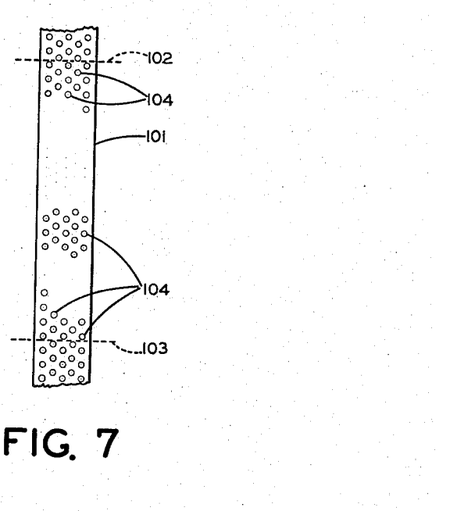

Still another variation of the unrefractory supporting means is illustrated in Fig. 7, which shows one of the major surfaces of a thin supporting form 101. As with the form 81 illustrated in Fig. 6, the form 101 may be placed or dipped successively in a coagulant and in a raw ceramic dispersion. However, again it is preferred to utilize the form 101 in the shape of a long roll which can be pulled through the coating apparatus in the same manner as may the form 81. For convenience of discussion a series of reference lines 102, 103, etc. is indicated in Fig. 7 at regular intervals along the form 101. The form 101 is pierced by a large number of apertures in the shape of circular holes 104 arranged in a pattern throughout the length of the form. These holes 104 are everywhere approximately regularly spaced from each other and from the edges of the form in all lateral directions, including the length and width directions along the form.

Figure 8:
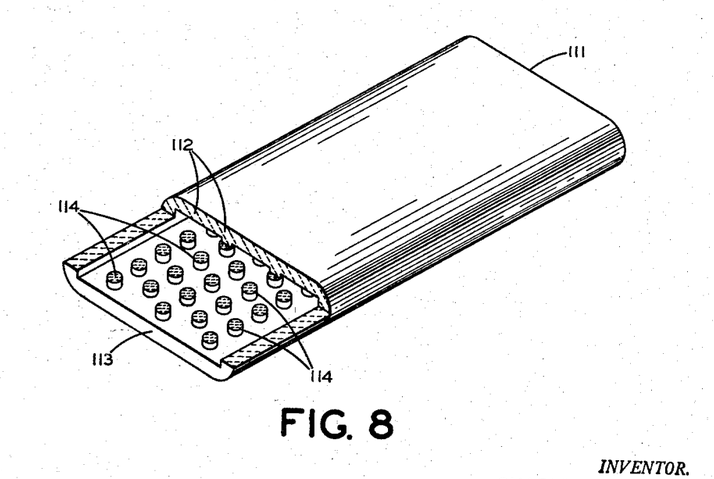
Fig. 8 is a perspective view, partially cut away, of a ceramic body of electromechanically sensitive material produced with the use of the supporting form shown in Fig. 7.

When the form passes through the apparatus of Fig. 4 and is dried, cut into lengths, and fired, the resulting ceramic pieces have the shape illustrated in perspective in Fig. 8. Fig. 8 shows a body 111 formed from one of these pieces, the upper half of the thickness of the body being cut away at one end of the body to reveal the internal structure. Thus it is seen that, again, the body 111 has an upper surface portion 112 and a lower surface portion 113, including edge portions running laterally along the body, these being the portions coated on the external surfaces of the form 101. Moreover, each length of the form 101 has at least several apertures, and specifically the numerous holes 104, each of which is filled by the ceramic material during the coating operation to provide, after firing, numerous connecting portions or posts 114 between the surface portions 112 and 113. The body 111 may be electroded inside and out, polarized, and mounted and connected in a bender transducer device having an operation quite similar to that of the above-mentioned bender devices which can be fabricated from the body 51 of Fig. 3 or the body 71 of Fig. 5.

As with the other types of supporting means illustrated in the drawings, the form 101 shown in Fig. 7 may vary in width over a wide range, and the cutting length between the reference lines 102 and 103 likewise may be varied. If a sufficiently wide form is used, shapes such as circles may be inscribed on the surface of the green body and cut or stamped out to provide, after firing, disk-like bodies having two circular surface portions joined by numerous posts 114. In fact, a form, having numerous holes similar to the holes 104 in the form 101, but of circular shape instead of elongated strip shape may be placed successively in the coagulant and in the dispersion to form a disk-like body having the same posts 114. A few small tabs should be provided, protruding from the periphery of this circular form, which can be broken off before firing to provide gaps in the peripheral edge portions which otherwise would extend completely around the green ceramic disk-like body. The unrefractory material of the form is eliminated as vapor through these peripheral gaps during firing, and the electrode material may be introduced through these same gaps into the interior spaces between the posts 114. A great variety of other shapes, which can be made using threads, strips, sheets, or other thin supporting means with apertures, will suggest themselves to those skilled in the art.

It will be appreciated that there is a practical limit to the width or shortest lateral dimension of the apertures or holes in the unrefractory supporting means. If this practical limit is exceeded substantially, the ceramic particles can be coagulated only with great difficulty so as to fill completely the regions over the apertures, and depressions will tend to be left in the coated surfaces with resulting non-uniformity of the over-all thickness dimension. If the practical limit is exceeded greatly, no material will deposit in the center of the apertures. The latter situation is illustrated in my aforementioned Patent No. 2,554,327. In Fig. 2 of the drawing of this patent a form is shown having numerous longitudinal holes which are about three times as wide as the over-all thickness of the body to be formed. Thus, as shown in Fig. 3 of the patent drawing, a separate coating is deposited around each leg of the form and no material remains in the holes except around the edges thereof.

A practical approximate limit for aperture width has been determined for a supporting means made up of a plurality of filamentary forms such as the threads 14 shown in the apparatus illustrated in Fig. 1 of the drawings appended hereto. When these threads or filaments are aligned in generally coplanar parallel relationship with the surfaces of each adjacent pair of threads spaced apart, thus leaving an aperture therebetween, the spacing can be a substantial distance, but this distance should not be substantially greater than the predetermined over-all thickness dimension of the green ceramic body. Thus the coating is deposited to cover the surfaces of the filamentary forms and to fill each aperture between the forms, and the coagulation is continued for a sufficient length of time to attain the predetermined over-all thickness dimension as measured in a direction normal to the plane in which the generally coplanar filamentary forms are aligned. If the thickness dimension, so measured, attained in the coating operation is much less than the distance separating each pair of filaments, great difficulty will be encountered in causing the ceramic raw material to deposit so as to fill the aperture. The same limitation of the spacing between the threads may be expressed differently by reference to any points within the aperture between adjacent pair of threads. Points may be found within each aperture, half way between the surfaces of the adjacent threads, which are the points in the aperture farthest removed from any surface of a thread, and the limitation may be stated that no point within the aperture should be farther from such adjacent surface than about half the over-all thickness dimension.

The same limitation may be expressed in a still more general manner, applicable not only to apertures or holes of a regular shape, such as the holes 82 and 83 in the form 81 shown in Fig. 6, but also to apertures of any irregular shape. Thus, in the general case, each such aperture should be sufficiently small in the smallest lateral dimension thereof that no point within the aperture is farther from the edge of that aperture than about half the over-all thickness dimension of the unfired body. In the case of the circular apertures 104 in the form 101 illustrated in Fig. 7, the point farthest from the edge of one of these circular holes is, of course, the center of the hole, so that this limitation requires that the radius of each hole should be not much greater than half of the over-all thickness dimension of the green ceramic body 111 prepared by coacting the form 101. In other words, the hole diameter should not be much greater than the over-all thickness.

While this discussion has indicated reasonable limits for the smallest lateral dimension of the apertures or holes in the supporting means, it should be pointed out that the apertures should not be made so small, and at the same time so few in number, that excessively wide portions of the supporting means are left between the apertures. An important reason for limiting the lateral dimensions along the supporting means between apertures is the tendency of the walls of the green ceramic body to sag or collapse during the ceramic-firing operation if the apertures are too wide. Thus, referring to Fig. 5, if one of the holes 76 were extremely wide compared to the thickness of the upper or lower surface portion 72 or 73, that surface portion would tend to sag or bend inwardly and other distortions would tend to occur in the shape of the body 71 during the firing operation after the unrefractory strips or supporting form had burned out but before the ceramic material had reached maturation. Furthermore, even after firing, a ceramic shape having wide holes and relatively thin walls lacks the mechanical ruggedness which is desirable in electromechanical transducer devices or in other ceramic devices. For producing the shape represented in Fig. 5 a practical approximate limit for the width of each of the supporting forms 61–63 used in the Fig. 4 apparatus may be stated by requiring that the material deposited in the surface portions 72 and 73 have a thickness dimension at least a fifth as great as the width of a strip 61, or of the corresponding hole 76 as measured horizontally in the view of Fig. 5 before the body 71 is fired.

An analogous limitation may be expressed more generally, so as to be applicable to unrefractory supporting means of numerous configurations. It is noted that, by virtue of the apertures in the supporting means, the means thus has a plurality of edge surfaces consisting of the marginal edges and of the edge around each aperture, so that from every point on each one of these edge surfaces there exists a minimal lateral distance measured across the unrefractory material of the supporting means to the nearest point on the next adjacent one of these edge surfaces. To insure adequate green and fired strength of the ceramic body, then, the coating operation should be continued to obtain a predetermined overall green thickness dimension which is large enough so that the thickness dimension of the coating over each major surface of the supporting means is at least a fifth as great as the largest of the aforesaid minimal lateral distances which can be measured between the edge surfaces across the supporting means.

Applying this limitation to the group of six threads used as the supporting means in the Fig. 1 apparatus, the minimal lateral distance measured across any of the unrefractory threads is the diameter of the thread; this diameter is the minimal distance across one of the four interior threads between adjacent apertures or between the outside surface of one of the outermost threads and the space between this thread and the next thread. Thus the thickness deposited over each thread should be at least a fifth as great as the diameter of an individual thread. As applied to the form 101 shown in Fig. 7, the minimal lateral distances are found by measuring from points on each edge surface of the form to the nearest edge of a hole 104 and by measuring from points on each hole 104 to the next adjacent holes. The thickness of each of the upper and lower surface portions 112 and 113 as viewed in Fig. 8 should be at least a fifth as great as the largest of the minimal lateral distances, so measured. This limitation insures that there will be no internal region, between the posts 114 or between a lateral edge of the body 111 and the posts, having lateral dimensions all of which are so great that there will be a serious tendency toward sagging, permanent deformation, or breakage of the body 111.

Reference should be made to the unrefractory material used for the supporting means or forms. For the threads 14 shown in Fig. 1 nylon has been found to be a very satisfactory material. In particular, a preferred embodiment of the method of the invention involves the use of a plurality of extensive forms, each with twisted multifilament structure but generally circular in cross-section. Cotton and silk threads have been used successfully, but a twist or thread made of three filaments, each spun from nylon staple fiber, has been found to be very well suited to the purpose. Such a thread has a generally circular cross section in spite of the surface irregularities between the filaments making up the twist. When the liquid coagulating agent is applied to such a multifilament thread, these minute depressions on the thread surface between the several filaments of the twist apparently serve to hold the liquid coagulant in a manner which improves the coagulating action during the deposition of the ceramic raw material on the threads.

It will be obvious that a material having a pronounced tendency to distort by shrinking or swelling during immersion in the liquid coagulant and in the liquid dispersion can cause difficulties, if used for the supporting means, because of a tendency for disruption of the green coatings when the material of the form distorts. Uniformity of the several longitudinally extensive forms used in the Fig. 1 and Fig. 4 arrangements should be observed to avoid unequal tensions in the individual threads or strips entering the dispersion container 27. A number of unrefractory materials is available, of course, for the non-filamentary forms shown in Figs. 4, 6, and 7, an example of a suitable material being a calendered parchment paper, which has high wet strength, leaves little ash, and has a desirable degree of porosity.

While there have been described what at present are considered to be the preferred embodiments of this invention, it will be obvious to those skilled in the art that various changes and modifications may be made therein without departing from the invention, and it is aimed therefore in the appended claims to cover all such changes and modifications as fall within the true spirit and scope of the invention.

What is claimed is:

1. The method of forming a dielectric ceramic element of generally rectangular cross-section having a pair of substantially parallel major planar surfaces and a plurality of spaced parallel longitudnally-extensive bores extending through the element in a common plane substantially midway between and parallel to said surfaces, comprising: pulling through a liquid coagulating agent longitudinally extensive heat-destructible core means of a configuration conforming to and adapted to form said bores; subsequently pulling said core means, with the coagulating agent thereon, through a dispersion of ceramic precursors of a dielectric ceramic material while maintaining the said core means disposed in co-planar, parallel relation spaced from each other by a constant distance; adjusting the rate of travel of said core means through said dispersion so as to enable the coagulating agent to accrete and gell on said core means a coherent mass of green ceramic of generally rectangular cross-section having a major planar surface on each side of and parallel to the plane of said core means; while said core means is passing through said dispersion, maintaining said constant distance at a value not exceeding the overall dimension of said coherent mass measured perpendicular to said major planar surfaces; and subjecting said green ceramic mass to a ceramic firing operation to mature said ceramic and destroy said core means.

2. The method of forming a ferroelectric ceramic transducer element of generally rectangular cross-section having a pair of substantially parallel major planar surfaces and a plurality of spaced parallel longitudinally-extensive bores extending through the element in a common plane substantially midway between and parallel to said surfaces, comprising: pulling through a liquid coagulating agent longitudinally extensive heat-destructible core means consisting of a plurality of textile filaments of generally circular cross-section, each adapted to form one of said bores; subsequently pulling said core means, with the coagulating agent thereon, through a dispersion of ceramic precursors of a polarizable, ferroelectric polycrystalline ceramic material while maintaining the individual filaments disposed in co-planar, parallel relation spaced from each other by a constant distance equal to about 1 to 3 times the diameter of said filaments; adjusting the rate of travel of said core means through said dispersion so as to enable the coagulating agent to accrete and gell on said core means a coherent mass of green ceramic of generally rectangular cross-section having a major planar surface on each side of and parallel to the plane of said filaments, the perpendicular distance between said major planar surfaces being about 2 to 4 times said filament diameter; and subjecting said green ceramic mass to a ceramic firing operation to mature said ceramic and destroy said core means.

3. The method of forming a ferroelectric ceramic transducer element of generally rectangular cross-section having a pair of substantially parallel major planar surfaces and a plurality of spaced parallel longitudinally-extensive co-planar bores extending through the element in a plane substantially midway between and parallel to said surfaces, comprising: pulling through a liquid coagulating agent longitudinally extensive heat-destructible core means consisting of at least three textile filaments of generally circular cross-section, each adapted to form one of said bores; subsequently pulling said core means, with the coagulating agent thereon, through a dispersion of ceramic precursors of a polarizable, ferroelectric polycrystalline ceramic material while maintaining the individual filaments disposed in co-planar, parallel relation spaced from each other by a constant distance approximately equal to the diameter of said filaments; adjusting the rate of travel of said core means through said dispersion so as to enable the coagulating agent to accrete and gell on and between said filaments a coherent mass of green ceramic of generally rectangular cross-section having a major planar surface on each side of and parallel to the plane of said filaments, the perpendicular distance between said major planar surfaces being about 4 times the filament diameter; and subjecting said green ceramic mass to a ceramic firing operation to mature said ceramic and destroy said core means.

4. The method of forming a ferroelectric ceramic transducer element of generally rectangular cross-section having a pair of substantially parallel major planar surfaces and a plurality of spaced parallel longitudinally-extensive rectangular bores extending through the element in a common plane substantially midway between and parallel to said surfaces, comprising: pulling through a liquid coagulating agent longitudinally extensive heat-destructible core means comprising a plurality of flat strips of non-refractory material of rectangular cross-section, each strip being adapted to form one of said bores; pulling said core means, with the coagulating agent thereon, through a dispersion of ceramic precursors of a polarizable, ferroelectric polycrystalline ceramic material while maintaining the individual strips disposed in co-planar, parallel relation spaced from each other by a constant distance; adjusting the rate of travel of said core means through said dispersion so as to enable the coagulating agent to accrete and gell on and between said core means a coherent mass of green ceramic of generally rectangular cross-section having a major planar surface on each side of and parallel to the plane of said strips; while said core means is passing through said dispersion, maintaining said constant distance at a value not exceeding the overall dimension of said coherent mass measured perpendicular to said major planar surfaces; and subjecting said green ceramic mass to a ceramic firing operation to mature said ceramic and destroy said core means.

References Cited in the file of this patent

UNITED STATES PATENTS

| | | |
|---|---|---|
| 2,171,006 | Morgan et al. | Aug. 29, 1939 |
| 2,339,003 | De Boer | Jan. 11, 1944 |
| 2,506,244 | Stopka | May 2, 1950 |
| 2,554,327 | Gravley | May 22, 1951 |
| 2,569,163 | Gravley | Sept. 25, 1951 |
| 2,679,823 | Denham | June 1, 1954 |

FOREIGN PATENTS

| | | |
|---|---|---|
| 463,430 | Great Britain | Mar. 30, 1937 |